UNITED STATES PATENT OFFICE.

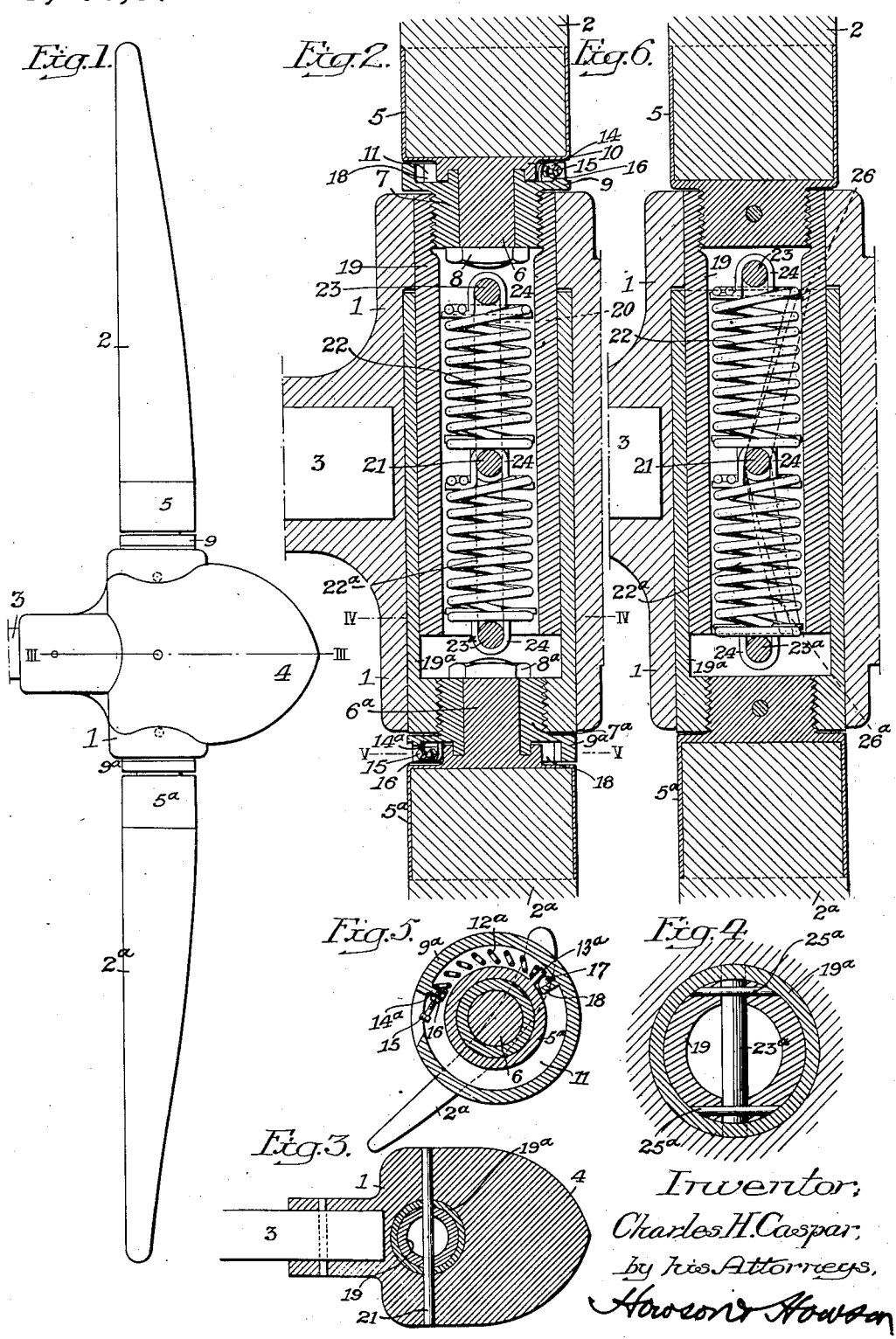

CHARLES H. CASPAR, OF PHILADELPHIA, PENNSYLVANIA.

PROPELLER.

1,370,876.

Specification of Letters Patent.

Patented Mar. 8, 1921.

Application filed October 22, 1918. Serial No. 259,189.

*To all whom it may concern:*

Be it known that I, CHARLES H. CASPAR, a citizen of the United States, residing in Philadelphia, Pennsylvania, have invented certain Improvements in Propellers, of which the following is a specification.

My invention relates to propellers for aeroplanes; and one object of my invention is to provide means whereby I can obtain, automatically, variable area in the sweep of the propeller blades. A further object of my invention is to obtain, automatically, variable pitch of the blades.

These and other features of my invention are more fully described hereinafter, reference being had to the accompanying drawings, in which:

Figure 1, is a view in elevation of a propeller made in accordance with my invention.

Fig. 2, is an enlarged sectional view of the hub of the propeller.

Fig. 3, is a sectional view on the line III—III, Fig. 1.

Figs. 4 and 5, are sectional views on the lines IV—IV and V—V, Fig. 2, respectively, and Fig. 6, is a sectional view similar to Fig. 2, illustrating a modified construction within the scope of my invention.

In the drawings, 1 represents the hub of my improved propeller; 2 and 2ª the blades, and 3 the shaft on which such hub is mounted. This hub may be provided with a stream-line projection 4, forwardly disposed, although this feature may be omitted without departing from my invention.

The blades 2, 2ª may be provided adjacent their point of connection with the hub with so-called holders or sockets 5, 5ª, each having an arbor 6, 6ª by means of which said blades are connected to and journaled in screw plugs 7 and 7ª; such arbors being held in position by nuts 8 and 8ª. The screw plugs 7, 7ª are provided with so-called cap portions 9, 9ª between which and the rim portion 10, 10ª of the propeller sockets a space 11, 11ª is formed, and within the spaces so provided tension springs 12, 12ª may be mounted.

The rim of each propeller socket is provided with a projection 13, 13ª, and each screw plug cap portion 9, 9ª is provided with a projection 14, 14ª, between which respective projections each of said springs is mounted. The projections 14, 14ª may each be provided with tension adjusting means in the shape of a bolt 15 threaded into each of said projections 14, 14ª and having a lock nut 16 whereby said bolt may be secured when properly adjusted. The projections 13, 13ª of the blade socket, when the blade is in its normal position, preferably engage elastic buffers 17 mounted on projections 18, also carried by the cap portion of the screw plug.

The respective screw plugs 7 and 7ª are connected to telescopic sleeves 19 and 19ª, the walls of which are slotted at 20 and 20ª, respectively, and the hub carries a centrally disposed pin 21, to which sets of springs 22 and 22ª are centrally anchored; the opposite ends of said springs being connected to pins 23 and 23ª carried by the telescopic sleeves 19 and 19ª, respectively. By preference, the several pins carry saddles 24, over which the ends of the springs are hooked. The sleeve 19 may be provided with stop pins 25 disposed adjacent the ends of its slots 20 for engagement with the pin 23ª of the sleeve 19ª to limit the inward movement of the same effected by the springs 22ª, and the sleeve 19ª may be equipped with stop pins 25ª performing a similar function with respect to the sleeve 19.

As may be readily understood centrifugal action, when the blades are rotating, will tend to throw the same outwardly, overcoming the tension of the springs 22 and 22ª, which will be elongated by such action, so that under the higher speeds the sweep of the blades will be materially increased. As the speed of rotation decreases, the tension of the springs will carry the blades inwardly toward their normal position. The higher speeds tend to lessen the air resistance with the surfaces of the blades in their normal position, and for this reason means are provided, such as the pivotal connection with the sleeves 19 and 19ª, which permit the blades to turn with respect to the hub; such movement being resisted to a certain extent by the springs 12, so that when lower speed is resumed, the blades will be automatically restored to their normal position with respect to the hub.

The slots in the sleeves 19 and 19ª are straight, so that outward movement of the blades against the tension of the springs 22 and 22ª will not change the angle of the same. If desired, however, these slots may be inclined or in the form of a helix, so that the blades will be automatically turned to increase the air resistance as they are thrown outwardly, and this arrangement, shown in Fig. 6, where the slots are indicated at 26 and 26ᵃ, is deemed to be within the scope of my invention.

The stop pins 25 and 25ᵃ carried by the sleeves 19 and 19ᵃ, respectively, have the further function of preventing separation of the sleeves upon outward movement of the blades due to centrifugal force. In such instance, these stop pins will contact with the centrally disposed pin 21, which passes through the hub and for which the sleeves are slotted to permit movement of the same with respect thereto.

I claim:

1. The combination, in a propeller, of a plurality of blades, mutually telescopic sleeves connected to the ends of said blades, tension means for each blade tending to hold said sleeves together, and a common anchorage for the inner ends of said tension means, such tension means being elongated when the blades revolve and move outwardly under centrifugal force.

2. The combination, in a propeller, of a hub, a plurality of blades, mutually telescopic sleeves mounted in said hub and connected to the ends of said blades; said sleeves being longitudinally movable in the hub, means preventing dislodgment of the sleeves with respect to the hub, tension means tending to hold said sleeves together and an anchorage for the tension means centrally located with respect to said hub, such tension means being elongated when the blades revolve and move outwardly under centrifugal force.

3. The combination, in a propeller, of a plurality of blades, mutually telescopic sleeves connected to the ends of said blades, pivotal connections between said blades and sleeves permitting rotative movement therebetween, tension means located within the inner sleeve and tending to hold said sleeves together; such tension means being elongated when the blades revolve and carry outwardly under centrifugal force, and means for anchoring the tension means to the hub and to the respective sleeves; said sleeves being slotted to pass such anchoring means.

4. The combination, in a propeller, of a hub, a plurality of blades, mutually telescopic sleeves connected to the ends of said blades and longitudinally movable in the hub, pivotal connections between said blades and sleeves permitting rotative movement therebetween, tension means tending to hold said sleeves in the inward position with respect to the hub; such tension means being elongated when the blades revolve and carry outwardly under centrifugal force, and means for resisting the turning movement of the blades with respect to the sleeves.

5. The combination, in a propeller, of a pair of blades, telescopic sleeves carried by the inner ends of said blades, pivotal connections between said blades and sleeves and tension means surrounding said pivotal connections between said sleeves and blades permitting changes in the pitch of said blades.

6. The combination, in a propeller, of a hub, telescopic sleeves carried by the inner ends of said blades and mounted in said hub, blades carried by said sleeves, pivotal connections between said blades and sleeves, and tension means surrounding said pivotal connections between said sleeves and blades permitting changes in the pitch of said blades.

CHARLES H. CASPAR.